US005333007A

United States Patent [19]

Kneezel et al.

[11] Patent Number: 5,333,007

[45] Date of Patent: Jul. 26, 1994

[54] MOISTURE LEAKAGE RESISTANT CAPPING SURFACE FOR INK JET PRINTHEAD

[75] Inventors: Gary A. Kneezel, Webster; Peter J. John; Bobbie A. Rice, both of Rochester; Herman A. Hermanson, Penfield; Almon P. Fisher, Rochester, all of N.Y.

[73] Assignee: Xerox Corporation, Stamford, Conn.

[21] Appl. No.: 116,816

[22] Filed: Aug. 11, 1993

Related U.S. Application Data

[63] Continuation of Ser. No. 778,535, Oct. 17, 1991, abandoned.

[51] Int. Cl.$^5$ .................... G01D 15/16

[52] U.S. Cl. .................... 347/20; 29/890.1

[58] Field of Search .................... 346/1.1, 140 R; 29/890.1; 156/1

[56] References Cited

U.S. PATENT DOCUMENTS

| | | | |
|---|---|---|---|
| 4,390,883 | 6/1983 | Stoneburner | 346/75 |
| 4,678,529 | 7/1987 | Drake et al. | 156/234 |
| 4,777,494 | 10/1988 | Shibata et al. | 346/1.1 |
| 4,914,562 | 4/1990 | Abe et al. | 346/140 R |
| 4,922,269 | 5/1990 | Ikea et al. | 346/140 R |
| 5,065,170 | 11/1991 | Rezanka et al. | 346/140 R |
| 5,117,244 | 5/1992 | Yu | 346/140 R |

*Primary Examiner*—A. T. Grimley
*Assistant Examiner*—Sandra L. Braser
*Attorney, Agent, or Firm*—Oliff & Berridge

[57] ABSTRACT

A printhead with a printhead die, an ink manifold and heat sink substrate has a continuous sealing surface surrounding the printhead die which is formed by the ink manifold, heat sink substrate and filler material disposed therebetween. The filler material acts as caulking to eliminate gaps around the printhead die, particularly between the ink manifold and heat sink substrate, and to provide a smooth surface for abutment with a capping member. A fluid-tight seal is obtained between the capping member and the continuous sealing surface on the printhead, thus preventing the drying out of ink in the nozzles through evaporation of volatile ink components. In some priming nozzle configurations, the leak-tight seal also facilitates priming of the printhead.

28 Claims, 1 Drawing Sheet

MOISTURE LEAKAGE RESISTANT CAPPING SURFACE FOR INK JET PRINTHEAD

This is a continuation of application Ser. No. 07/778,535 filed Oct. 17, 1991, now abandoned.

BACKGROUND OF THE INVENTION

1. Field of the Invention

The present invention relates to an ink jet printer, and, more particularly, to an ink jet printer having a printhead with a continuous sealing surface for coupling to a moisture leakage resistant capping member.

2. Description of the Related Art

Ink jet printing systems can generally be divided into two types: one type which uses thermal energy to produce a vapor bubble in an ink filled channel that expels a droplet of ink; and a second type which uses a piezoelectric transducer to produce a pressure pulse that expels a droplet from a nozzle.

Thermal ink jet printing systems use thermal energy selectively produced by resistors located in capillary-filled ink channels near channel terminating nozzles or orifices to momentarily vaporize the ink and form bubbles on demand. Each temporary bubble expels an ink droplet and propels it towards a recording medium. The printing system may be incorporated in either a carriage-type printer or a pagewidth type printer. The carriage-type printer generally has a relatively small printhead containing the ink channels and nozzles. The printhead is usually sealingly attached to an ink manifold or to a disposable ink supply cartridge. The combined printhead and manifold or cartridge assembly is reciprocated to print one swath of information at a time on a stationarily held recording medium, such as paper. After the swath is printed, the paper is stepped a distance equal to the height of the printed swath, so that the next printed swath will be contiguous therewith. The procedure is repeated until the entire page is printed. In contrast, the pagewidth printer has a stationary printhead having a length equal to or greater than the width of the paper. The paper is continuously moved past the pagewidth printhead in a direction normal to the printhead length and at a constant speed during the printing process.

Piezoelectric activated ink jet printing systems use a pulse generator which provides an electric signal. The signal is applied across crystal plates, one of which contracts and the other of which expands, thereby causing the plate assembly to deflect toward a pressure chamber. This causes a decrease in volume which imparts sufficient kinetic energy to the ink in the printhead nozzle so that one ink droplet is ejected onto a recording medium.

In the ink jet printing systems of the above- types, several problems have arisen which adversely affect the quality of performance of printing. Among these problems are 1) evaporation of the volatile ink ingredients, including water; 2) clogging of the printhead nozzles caused by ink drying therein due to non-use for a period of time; 3) adherence of dust to the nozzle-containing face of the printhead due to the moisture of fluid ink around the nozzle; 4) leakage of ink from the nozzles; 5) bubbles and dust taken into the printhead nozzles as a result of external causes such as vibration imparted to the printhead and environmental changes occurring around the printhead; and 6) contamination of the printhead nozzles when the printhead is not in use, such contamination including, for example, non-collapsing air bubbles.

To alleviate these problems and enhance the quality and performance of the printhead, protective caps have been developed to cover the printhead when printing is not occurring. Generally, these caps are applied to a printhead when it is in its "home position" between printing jobs. However, a reliable seal is difficult to achieve with the capping members because the printhead assembly is often not fluid-tight or sufficiently vapor-tight. Also, if the surfaces surrounding the printhead die, such as the ink manifold and substrate, are not precisely aligned, there will be a discontinuous surface for the capping member to abut. Therefore, air leaks may occur between the printhead and the cap which allow the printhead die to become contaminated and cause the volatile ink ingredients to evaporate.

Several approaches have been proposed to address the above problems. For example, U.S. Pat. No. 4,390,883 to Stoneburner discloses a fluid jet printer within an inflation means for internally sealing the nozzles and their printhead. This approach internally blocks ink from passing through the nozzles but does not provide exterior protection.

Related U.S. Patent Application 07/542,053 now U.S. Pat. No. 5,065,170, to Rezanka et al. uses a capping member which abuts the printhead die. The die sits on a resilient gasket, but a continuous surface between the front surfaces of the substrate and manifold is not provided.

U.S. Pat. No. 4,914,562 to Abe et al., discloses a protective film which covers the heating elements within a thermal ink jet. However, this approach does not prevent evaporation or contamination of ink through the nozzles.

Another approach to protecting the heating elements of a thermal ink jet printer is shown by U.S. Pat. No. 4,777,494 to Shibata et al., which uses electrodes having a protective layer which is self-healing through anodic oxidation treatment. A method of sealing ink jet printhead components together using adhesive between upper and lower plates of a printhead die is shown by U.S. Pat. No. 4,678,529 to Drake et al. However, this approach does not seal the printhead die to the manifold or substrate.

OBJECTS AND SUMMARY OF THE INVENTION

It is an object of the present invention to provide a moisture leakage resistant capping surface for an ink jet printhead.

It is another object of the present invention to provide a continuous surface on the printhead to accommodate a capping member.

It is a further object of the present invention to provide a printhead assembly which is simple to assemble and for which assembly may be easily automated.

It is still a further object of the present invention to provide a sealable printhead assembly which is low in cost.

To achieve the foregoing and other objects, and to overcome the shortcomings discussed above, an ink jet printhead assembly is provided which has a continuous sealing surface. The printhead assembly comprises a printhead die having an upper face, a lower face, opposed sides and a front face with nozzles therein. A substrate having a front face is coupled to the lower face of the printhead die, and an ink manifold having a front face is coupled to the upper face of the printhead die. The manifold has a pair of flanges which extend adjacent the opposed sides of the printhead die toward the substrate. A gap is defined between each of the flanges of the manifold and the substrate. Filler material is disposed within the gap to provide a generally continuous sealing surface with the front face of the manifold and the front face of the substrate around the printhead die. A capping member sealingly engages the continuous surface on the printhead in a substantially fluid-tight manner.

The sealing surface on the printhead is provided by the method of coupling the printhead die to the substrate and coupling the ink manifold to the printhead die to form a gap between the manifold and the substrate. A bead of filler material is applied into the gap, and the excess filler material is wiped from the manifold and the substrate. The filler material together with the manifold and substrate form the sealing surface of the printhead. A capping member is sealingly engaged to the sealing surface to cover the printhead die.

BRIEF DESCRIPTION OF THE DRAWINGS

The invention is described in detail with reference to the following drawings in which like reference numerals refer to like elements and wherein.

DETAILED DESCRIPTION OF THE PREFERRED EMBODIMENTS

The terms used herein, such as upper, lower, side and front, are for descriptive purposes only and are not intended to have a limiting effect.

Figure 1:
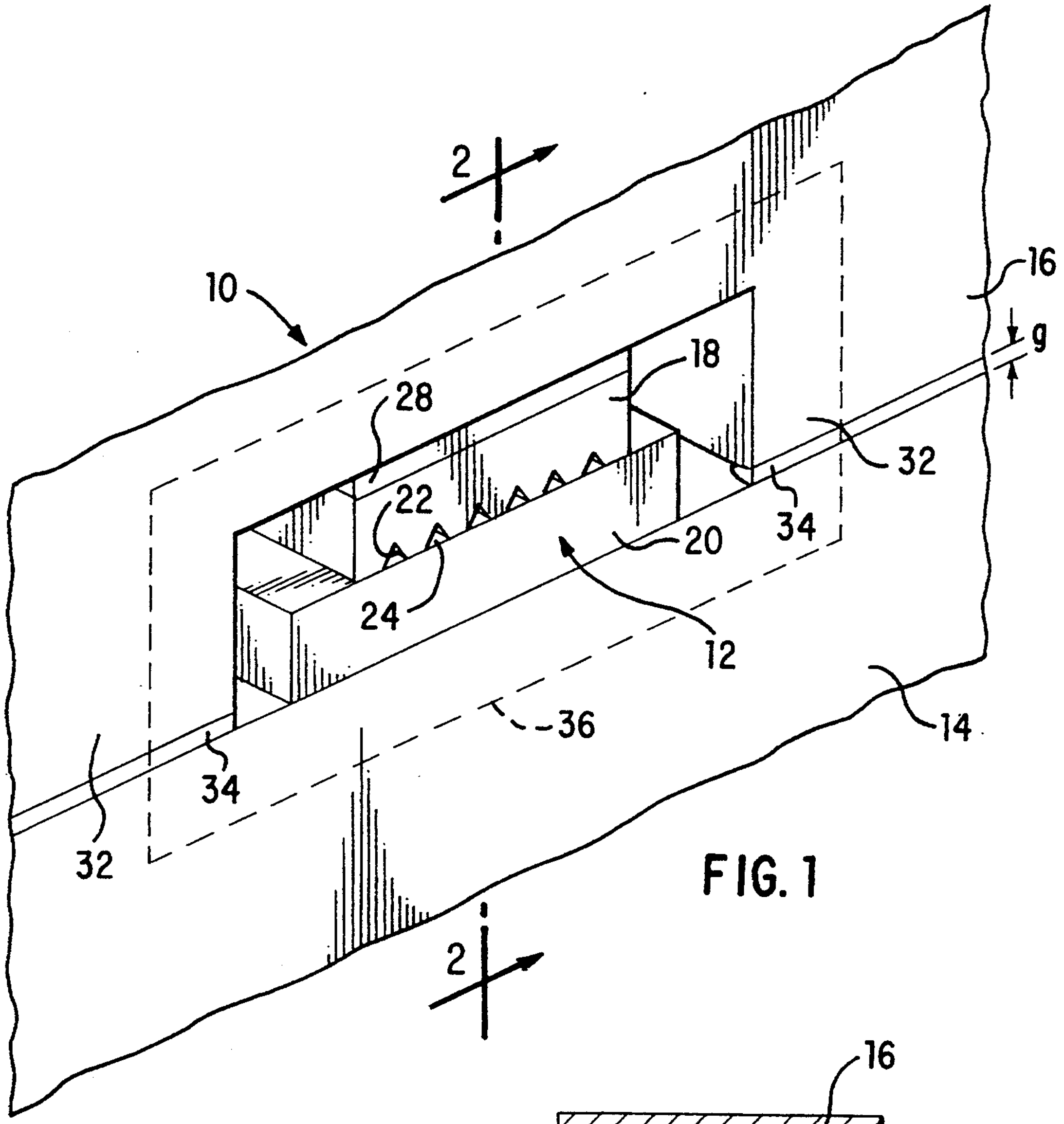
FIG. 1 is a perspective view of the printhead for an ink jet printer.

Referring to the drawings, FIG. 1 shows a printhead 10 in accordance with the present invention. Printhead 10 includes a printhead die 12, a heat sink substrate 14 and an ink manifold 16.

Figure 2:
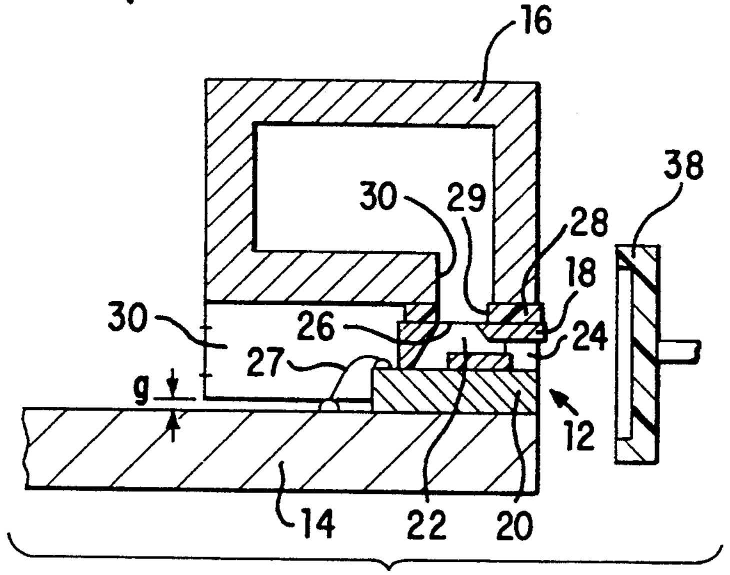
FIG. 2 is a side view in cross-section of the printhead of FIG. 1 taken along line 2—2 and a capping member.

As shown in FIGS. 1 and 2, each printhead die 12 comprises a channel plate 18 and a heater plate 20. Channel plate 18 is attached to heater plate 20 as shown in FIG. 1. The surface of heater plate 20, to which channel plate 18 is attached, has a plurality of resistive heater elements (not shown). The opposite surface of heater plate 20 is bonded to substrate 14. Alternatively, heater plate 20 can be secured to substrate 14 by other known means for securement.

The surface of channel plate 18 which is positioned on heater plate 20 has grooves which define ink channels 22 and form nozzles 24 in the front face of printhead die 20. The opposite surface of channel plate 18 has an ink receiving opening 26 (see FIG. 2) located therein. The heater elements of heater plate 20 correspond in number and position to the ink channels 22 in channel plate 18. Channel plate 18 and heater plate 20 are coupled together and a dicing action is performed to achieve coplanarity along the front face to produce nozzles 24. Heater plate 20 preferably extends beyond channel plate 18 along at least one of the remaining edges thereof (the side and rear edges) as shown in FIG. 1 for the purpose of electrical interconnection through wire bond 27.

Ink manifold 16 is positioned on the printhead die 12 and sealed thereto by an elastomeric or adhering seal 28. Seal 28 has an opening 29 which aligns with opening 26 in channel plate 18. Alternatively, other conventional means for sealingly coupling ink manifold 16 to printhead die 12 may be employed. Ink manifold 16 further includes an opening 30 located above the ink receiving opening 26 of channel plate 18. Manifold opening 30 and ink receiving opening 26 provide communication between the interior of manifold 16 and the interior of printhead die 12 through the opening 29 in seal 28.

Ink manifold 16 has flanges 32 which extend on both sides of printhead die 12 toward substrate 14. A gap g is defined between flanges 32 of ink manifold 16 and heat sink substrate 14. Thus, printhead die 12 is substantially surrounded by ink manifold 16 and heat sink substrate 14.

Figure 3:
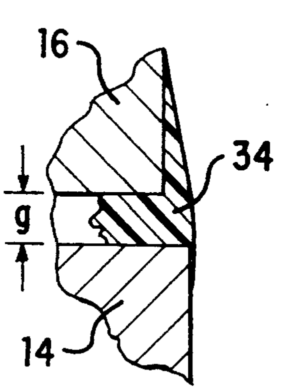
FIG. 3 is an enlarged side view in cross-section of the gap between an offset substrate and ink manifold with filler material disposed therein.

Filler material 34 is disposed in gap g to close the gap and provide a continuous surface between ink manifold 16 and heat sink substrate 14. The filler material is a spreadable sealing material, preferably epoxy. Of course, other materials suitable for caulking, such as silicone, may be employed. One such material is Dow Corning 3145 nonflowable silicone. A bead of filler material is trowelled into gap g, as shown in FIG. 3, to fully close the gap and seal the front surfaces of the ink manifold 16 and substrate 14 to each other. Thus, a continuous sealing surface 36, shown in phantom in FIG. 1, is formed and includes ink manifold 16, filler material 34 and substrate 14 which completely surround printhead die 12.

A capping member 38 is secured within the ink jet printer. When the printhead is in the "home position" during non-functioning periods, capping member 38 is adapted to cover printhead die 12 and seal printhead 10 by contacting the continuous sealing surface 36 created by ink manifold 16, filler material 34 and substrate 14. Since filler material 34 provides a leak-proof seal between ink manifold 16 and substrate 14, capping member 38 seals to printhead 10 a fluid-tight manner. In the case where the front faces of ink manifold 16 and substrate 14 are not in precise alignment, as shown in FIG. 3, filler material 34 acts as a ramp inclined between the two surfaces thus eliminating any steps which could create leaks between the printhead 10 and capping member 38.

Capping member 38 is preferably formed of an elastomeric material, such as RTV silicon, which can conform to minor nonuniformities on the surface of the printhead. Capping member 38 can also include maintenance members, such as cleaning devices or priming pumps. In the case of a priming pump, the continuous sealing surface 36 enhances the priming function since air leaks are eliminated. Capping member 38 is shown as a lipped plate in FIG. 2 but may embody any shape which will sufficiently cover the printhead die. Also, the capping member may be a solid resilient material as shown or include resilient seals disposed along its edges.

Assembly

As discussed above, a bead of filler material 34 is applied to gap g. The bead is pressed into the gap and finished by wiping the excess filler material from the surfaces of the ink manifold 16 and substrate 14. The filler material may be applied to the gap with a conventional trowel and leveled with a doctor blade. However, the assembly can easily be automated by using syringe deposition with an adjacent blade which move together along the face of the printhead, starting adjacent to the die 12 and moving along the faces of manifold 16 and substrate 14. Either one syringe and blade would be used on one side of the printhead die 12 and then the other, or two syringe/blade pairs would be used.

Filler material 34 is applied in a very thin layer so that printhead die 12 does not extend beyond the substrate 14 and the front of the capping surface of the capping member is easy to maintain at a precise distance from the front of the die.

Alternatively, a thin self-leveling layer of filler material may be deposited on the gap g to flow into and along the face of the printhead after deposition and reflow under application of heat. Also, a thin flexible tape with adhesive backing may be secured to the front surface of the manifold 16 and substrate 14.

While this invention has been described in conjunction with specific embodiments thereof, it is evident that many alternatives, modifications and variations would be apparent to those skilled in the art. For example, the invention may be practiced for a single printhead, a staggered array of printheads or a pagewidth printhead. Also, the printhead may embody any type of conventional printhead having the problem of air leaks therein. For example, the invention may be applied in a piezoelectric activated ink jet printing system rather than a thermal ink jet printing system. Accordingly, the preferred embodiments of the invention as set forth herein are intended to be illustrative, not limiting. Various changes may be made without departing from the spirit and scope of the invention as defined in the appended claims.

What is claimed is:

1. An ink jet printhead assembly, comprising:
   - a printhead die having an upper face, a lower face, opposed sides and a front face with nozzles therein;
   - a substrate having a front face and being coupled to said lower face of said printhead die;
   - an ink manifold having a front face and being coupled to said upper face of said printhead die, said manifold having a pair of flanges which extend adjacent said opposed sides of said printhead die toward said substrate, wherein a gap is defined between each of said flanges of said manifold and said substrate; and
   - spreadable sealing filler material disposed within said gap to provide a generally continuous sealing surface with said front face of said manifold and said front face of said substrate around said printhead die.

2. An ink jet printhead assembly according to claim 1, wherein said filler material is caulking.

3. An ink jet printhead assembly according to claim 1, wherein said filler material is epoxy.

4. An ink jet printhead assembly according to claim 1, wherein said filler material is silicone.

5. An ink jet printhead assembly according to claim 1, wherein said front face of said substrate and said front face of said manifold are generally coplanar.

6. An ink jet printhead assembly according to claim 1, wherein said front face of said substrate is offset from said front face of said manifold.

7. An ink jet printhead assembly according to claim 6, wherein said filler material forms a ramp inclined between said front face of said substrate and said front face of said manifold.

8. An ink jet printhead assembly according to claim 1, wherein said filler material forms a ramp inclined between said front face of said substrate and said front face of said manifold.

9. An ink jet printhead assembly according to claim 1, further comprising a capping member for capping said printhead die in a substantially fluid-tight manner, said capping member abutting against said continuous sealing surface around said printhead die.

10. An ink jet printhead assembly according to claim 9, wherein said capping member,is elastomeric.

11. An ink jet printhead assembly according to claim 1, wherein said printhead die is bonded to said substrate.

12. An ink jet printhead assembly according to claim 1, wherein said manifold is sealed to said printhead die.

13. An ink jet printhead assembly according to claim 1, wherein said filler material is self-leveling and flows into and along said faces of said substrate and said manifold and reflows under application of heat.

14. An ink jet printhead assembly according to claim 1, wherein said filler material is a thin flexible tape with adhesive backing.

15. A sealing assembly for an ink jet printhead, comprising:
   - a printhead die having a front face with nozzles therein;
   - a substrate bonded to said printhead die and having a front face;
   - an ink manifold sealed to said printhead die and having a front face; and
   - a spreadable sealing filler material caulked between said substrate and said manifold on opposed sides of said printhead die,
   - wherein said front face of said substrate, said front face of said manifold and said caulked filler material form a continuous surface surrounding said printhead die.

16. A sealing assembly for an ink jet printhead according to claim 15, further comprising a capping means for sealingly engaging said continuous surface surrounding said printhead die.

17. A method for providing a sealing surface on a printhead, comprising the sequential steps of:
   - coupling a printhead die to a substrate;
   - coupling an ink manifold to the printhead die and forming a gap between the manifold and the substrate;
   - applying a bead of filler material into the gap between the manifold and the substrate; and
   - wiping the excess filler material from the manifold and the substrate to form a sealing surface defined by the manifold, filler material and substrate.

18. A method according to claim 17, wherein said step of coupling the printhead die to the substrate includes bonding the printhead die to the substrate.

19. A method according to claim 17, wherein said step of coupling the ink manifold to the printhead die includes sealing the manifold to the printhead die.

20. A method according to claim 17, further comprising the step of sealingly engaging a capping member to the sealing surface and covering the printhead die.

21. A method according to claim 17, wherein the step of applying and wiping the filler material includes depositing the filler material with a syringe having an adjacent blade for moving along faces of the manifold and substrate.

22. A method according to claim 17, wherein said filler material is self-leveling and flows into and along the gap and the manifold and substrate and reflows under the application of heat.

23. An ink jet printhead assembly comprising:

a front face including a printhead die, a substrate and an ink manifold, wherein a gap is defined between said substrate and said ink manifold adjacent said printhead die after assembly; and a spreadable sealing filler material disposed within said gap, said filler material being disposed in said gap by the process of applying a bead of said filler material into said gap and wiping excess filler material from said front face to form a continuous sealing surface on said front face.

24. The ink jet printhead assembly of claim 23 wherein said filler material is epoxy.

25. The ink jet printhead assembly of claim 23, wherein said front face is planar.

26. The ink jet printhead assembly of claim 23, wherein said front face is stepped and said filler material forms a ramp inclined between said substrate and said manifold.

27. The ink jet printhead assembly of claim 23, wherein said filler material is self-leveling and flows into and along said gap and reflows under application of heat.

28. The ink jet printhead assembly of claim 23, wherein said filler material is caulking and said process of applying said filler material to said gap includes depositing said filler material with a syringe and scraping the excess filler material with a blade.

* * * * *